(12) United States Patent
Wiegman

(10) Patent No.: US 11,437,662 B1
(45) Date of Patent: Sep. 6, 2022

(54) BATTERY ASSEMBLY FOR USE IN AN ELECTRIC AIRCRAFT

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/383,519

(22) Filed: Jul. 23, 2021

(51) Int. Cl.
| | |
|---|---|
| *H01M 10/48* | (2006.01) |
| *B60L 50/64* | (2019.01) |
| *H01M 10/625* | (2014.01) |
| *B64D 27/24* | (2006.01) |
| *B60L 58/26* | (2019.01) |
| *H01M 10/653* | (2014.01) |
| *H01M 10/658* | (2014.01) |
| *H01M 50/209* | (2021.01) |
| *H01M 10/647* | (2014.01) |

(52) U.S. Cl.
CPC ........... *H01M 10/486* (2013.01); *B60L 50/64* (2019.02); *B60L 58/26* (2019.02); *B64D 27/24* (2013.01); *H01M 10/625* (2015.04); *H01M 10/647* (2015.04); *H01M 10/653* (2015.04); *H01M 10/658* (2015.04); *H01M 50/209* (2021.01); *B60L 2200/10* (2013.01); *H01M 2220/20* (2013.01)

(58) Field of Classification Search
CPC combination set(s) only.
See application file for complete search history.

(56) References Cited

U.S. PATENT DOCUMENTS

| | | | |
|---|---|---|---|
| 4,114,083 A * | 9/1978 | Benham | H02J 7/00309 |
| | | | 340/636.13 |
| 8,993,145 B2 | 3/2015 | Muniz | |
| 10,873,111 B2 | 12/2020 | Melack | |
| 2010/0104938 A1* | 4/2010 | Hermann | H01M 10/6557 |
| | | | 429/120 |
| 2016/0172727 A1* | 6/2016 | Chan | H01M 50/20 |
| | | | 429/120 |
| 2018/0294536 A1* | 10/2018 | Kruszelnicki | H01M 10/6557 |
| 2021/0143492 A1* | 5/2021 | Zagrodnik | H01M 10/6568 |

FOREIGN PATENT DOCUMENTS

| | | | | |
|---|---|---|---|---|
| CN | 206379429 U | * | 8/2017 | |
| CN | 212648327 U | * | 3/2021 | |
| WO | WO-2020104658 A1 | * | 5/2020 | ........... H01M 10/482 |
| WO | WO-2022018739 A1 | * | 1/2022 | |

* cited by examiner

*Primary Examiner* — Jonathan G Jelsma
(74) *Attorney, Agent, or Firm* — Caldwell Intellectual Property Law

(57) ABSTRACT

A battery assembly for use in an electric aircraft, the battery assembly including a plurality of battery cells, four opposite and opposing sides, where at least two sides are angled inward as to secure the plurality of battery cells inside the battery assembly, and at least a sensor, where the at least a sensor is configured to detect a thermal runaway.

20 Claims, 6 Drawing Sheets

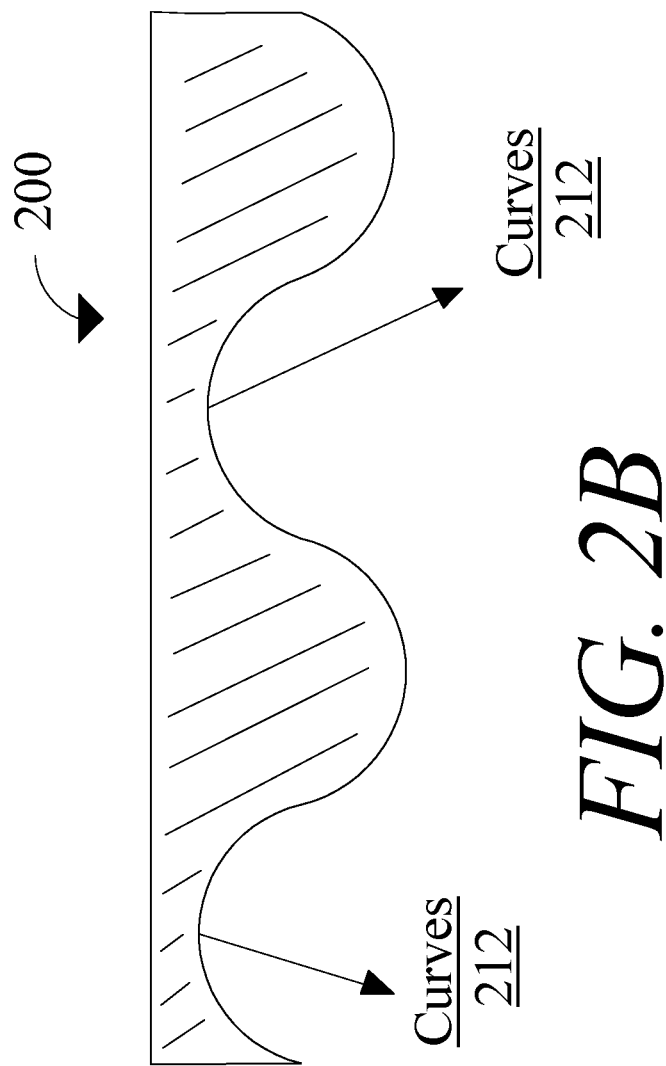

BATTERY ASSEMBLY FOR USE IN AN ELECTRIC AIRCRAFT

FIELD OF THE INVENTION

The present invention generally relates to the field of electric aircraft. In particular, the present invention is directed to a battery assembly for use in an electric aircraft.

BACKGROUND

In some circumstances, a battery cell may short-circuit causing the cell to rupture. This cell rupture may cause a rapid rise in temperature that causes ruptures in adjacent cells, commonly referred as thermal runaway, that may damage the battery and any other parts in close proximity to the battery. In an electric aircraft, a thermal runaway may be fatal to the pilot and anyone inside as the aircraft may lose function mid-air.

SUMMARY OF THE DISCLOSURE

In an aspect a battery assembly for use in an electric aircraft, where the battery assembly includes a plurality of battery cells, four opposite and opposing sides, where at least two sides are angled inward as to secure the plurality of battery cells inside the battery assembly, and at least a sensor, where the at least a sensor is configured to detect a thermal runaway.

This and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2B is an exemplary embodiment of a section of a cooling plate;

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to a battery assembly for use in an electric aircraft. In an embodiment, the battery assembly includes four sides, where at least two sides are angled as to keep the battery cells inside the battery module, a plurality of battery cells, insulation sleeves and cooling plates, where each cooling plate is disposed between a row of battery cells and an insulation sleeve, where the side of the cooling plate facing the insulation sleeve is coated in flame retardant paint.

Aspects of the present disclosure can be used to control the dissipation of heat in a battery module as to prevent a thermal runaway that may damage the whole battery pack. This is so, at least in part, because the battery module isolates rows of battery cells between a cooling plate and an insulation sleeve, where the cooling plate is coated in flame retardant paint on the side facing the insulation sleeve.

Aspects of the present disclosure allow for isolating the heat dissipation within the battery module or a row of cells. Exemplary embodiments illustrating aspects of the present disclosure are described below in the context of several specific examples.

Figure 1:
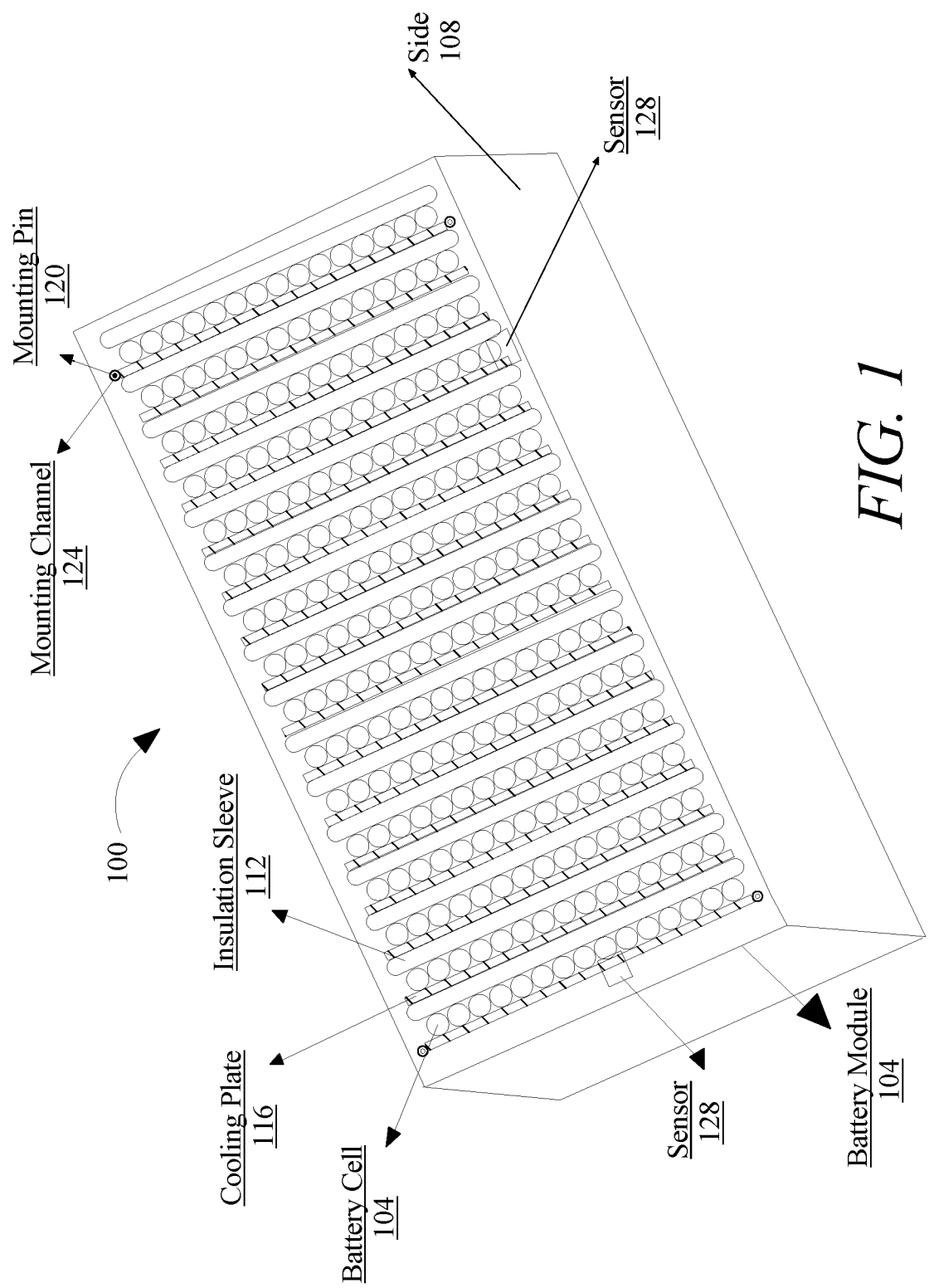
FIG. 1 is an exemplary representation of a battery assembly for use in an electric aircraft.

Referring now to the drawings, FIG. 1 illustrates a perspective view of a battery assembly 100 for use in an electric aircraft. The battery assembly 100 illustrated is merely exemplary and should not be considered limiting in any way. Battery assembly 100 is configured to control the dissipation of heat within a battery module as to prevent, or at least reduce the likeability, of a thermal runaway. In some embodiments, battery assembly 100 may include a plurality of pouch cells. "Pouch cell", as defined in this disclosure may include any definition defined in Non-provisional application Ser. No. 17/348,960 filed on Jun. 16, 2020 and entitled "BATTERY PACK FOR ELECTRIC VERTICAL TAKE-OFF AND LANDING AIRCRAFT," incorporated herein by reference in its entirety.

Still referring to FIG. 1, battery assembly 100 is designed and configured to include a plurality of battery cells 104. The battery cells 104 may utilize electrochemical cells, galvanic cells, electrolytic cells, fuel cells, flow cells, and/or voltaic cells. In general, an electrochemical cell is a device capable of generating electrical energy from chemical reactions or using electrical energy to cause chemical reactions, this disclosure will focus on the former. Voltaic or galvanic cells are electrochemical cells that generate electric current from chemical reactions, while electrolytic cells generate chemical reactions via electrolysis. In general, the term 'battery' is used as a collection of cells connected in series or parallel to each other. A battery cell may, when used in conjunction with other cells, may be electrically connected in series, in parallel or a combination of series and parallel. Series connection includes wiring a first terminal of a first cell to a second terminal of a second cell and further configured to include a single conductive path for electricity to flow while maintaining the same current (measured in Amperes) through any component in the circuit. A battery cell may use the term 'wired', but one of ordinary skill in the art would appreciate that this term is synonymous with 'electrically connected', and that there are many ways to couple electrical elements like battery cells together. An example of a connector that does not include wires may be prefabricated terminals of a first gender that mate with a second terminal with a second gender. Battery cells may be wired in parallel. Parallel connection includes wiring a first and second terminal of a first battery cell to a first and second terminal of a second battery cell and further configured to include more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in a virtually unlimited arrangement which may confer onto the system the electrical advantages associated with that arrangement such as high-voltage applications, high-current applications, or the like. In an exemplary embodiment, battery assembly 100 include 196 battery cells in series and 18 battery cells in parallel. This is, as someone of ordinary skill in the art would appreciate, is only an example and battery assembly 100 may be configured to have a near limitless arrangement of battery cell configurations. Battery assembly 100 may include any embodiment defined in Non-provisional application Ser. No. 17/008,721 filed on Sep. 1, 2020 and entitled "SYSTEM AND METHOD FOR SECURING BATTERY IN AIRCRAFT," and Non-provisional application Ser. No. 16/948,141 filed on Sep. 4, 2020 and entitled "COOLING ASSEMBLY FOR USE IN A BATTERY MODULE ASSEMBLY," both incorporated herein by reference in its entirety.

With continued reference to FIG. 1, the battery assembly 100 may also include an end panel including a plurality of electrical connectors and further configured to fix the battery assembly 100 in alignment with at least the side wall. The end panel may include a plurality of electrical connectors of a first gender configured to electrically and mechanically couple to electrical connectors of a second gender. The end panel may be configured to convey electrical energy from battery cells to at least a portion of an eVTOL aircraft. Electrical energy may be configured to power at least a portion of an eVTOL aircraft or include signals to notify aircraft computers, personnel, users, pilots, and any others of information regarding battery health, emergencies, and/or electrical characteristics. The plurality of electrical connectors may include blind mate connectors, plug and socket connectors, screw terminals, ring and spade connectors, blade connectors, and/or an undisclosed type alone or in combination. The electrical connectors of which the end panel includes may be configured for power and communication purposes. A first end of the end panel may be configured to mechanically couple to a first end of a first side wall by a snap attachment mechanism, similar to end cap and side panel configuration utilized in the battery module. To reiterate, a protrusion disposed in or on the end panel may be captured, at least in part, by a receptacle disposed in or on the side wall. A second end of end the panel may be mechanically coupled to a second end of a second side wall in a similar or the same mechanism.

With continued reference to FIG. 1, any of the disclosed components or systems, namely battery assembly 100, and/or battery cells 104 may incorporate provisions to dissipate heat energy present due to electrical resistance in integral circuit. Battery assembly 100 includes one or more battery element modules wired in series and/or parallel. The presence of a voltage difference and associated amperage inevitably will increase heat energy present in and around battery assembly 100. The presence of heat energy in a power system is potentially dangerous by introducing energy possibly sufficient to damage mechanical, electrical, and/or other systems present in at least a portion of exemplary electric aircraft. Battery assembly 100 may include mechanical design elements, one of ordinary skill in the art, may thermodynamically dissipate heat energy away from battery assembly 100. The mechanical design may include, but is not limited to, slots, fins, heat sinks, perforations, a combination thereof, or another undisclosed element. Battery assembly may be Heat dissipation may include material selection beneficial to move heat energy in a suitable manner for operation of battery assembly 100. Certain materials with specific atomic structures and therefore specific elemental or alloyed properties and characteristics may be selected in construction of battery assembly 100 to transfer heat energy out of a vulnerable location or selected to withstand certain levels of heat energy output that may potentially damage an otherwise unprotected component. One of ordinary skill in the art, after reading the entirety of this disclosure would understand that material selection may include titanium, steel alloys, nickel, copper, nickel-copper alloys such as Monel, tantalum and tantalum alloys, tungsten and tungsten alloys such as Inconel, a combination thereof, or another undisclosed material or combination thereof. Heat dissipation may include a combination of mechanical design and material selection. The responsibility of heat dissipation may fall upon the material selection and design as disclosed herein in regard to any component disclosed in this paper.

According to embodiments, the circuitry disposed within or on battery assembly 100 may be shielded from electromagnetic interference. The battery elements and associated circuitry may be shielded by material such as mylar, aluminum, copper a combination thereof, or another suitable material. The battery assembly 100 and associated circuitry may include one or more of the aforementioned materials in their inherent construction or additionally added after manufacture for the express purpose of shielding a vulnerable component. The battery assembly 100 and associated circuitry may alternatively or additionally be shielded by location. Electrochemical interference shielding by location includes a design configured to separate a potentially vulnerable component from energy that may compromise the function of said component. The location of vulnerable component may be a physical uninterrupted distance away from an interfering energy source, or location configured to include a shielding element between energy source and target component. The shielding may include an aforementioned material in this section, a mechanical design configured to dissipate the interfering energy, and/or a combination thereof. The shielding comprising material, location and additional shielding elements may defend a vulnerable component from one or more types of energy at a single time and instance or include separate shielding for individual potentially interfering energies. In some embodiments the battery assembly 100 may be made of metal. In some embodiments the battery assembly 100 is made of aluminum. In some embodiments, the battery assembly 100 is made of 1000 series aluminum.

Alternatively, or additionally, and still referring to FIG. 1, the battery assembly 100 may further include a bottom side. In embodiments, the battery assembly 100 may include a top part that function as a lid. In one embodiment, the top side is coated in flame retardant paint. In embodiments, the top side may include a flame retardant Polyurethane Foam. In some embodiments, the battery assembly 100 may include a first vent hole in one of the sides, and second vent hole on the side opposite to the side with the first vent hole. In on embodiment, the outside of the vent holes may include thermally conductive material that allows for cooling of the battery module as a function of the aircraft's movements while preventing debris from entering the battery assembly through the vent hole. In a nonlimiting example, colder air from outside the aircraft may enter the module and thermally conductive material may allow for the colder temperature to spread throughout the battery module as to cool reduce the internal temperature of the module. In some embodiments, the bottom side may be coated with intumescent paint. In one embodiment top side may be coated with intumescent paint. In some embodiments an outside of battery assembly may be coated with intumescent paint. In one embodiment, an underside of top side may be coated with intumescent paint.

Continuing to refer to FIG. 1, the battery assembly 100 includes four sides 108, where two of the sides 108 are angled inward as to secure the plurality of battery cells 104 within the battery assembly 100. In a nonlimiting example, the sides are designed in a way where once the cells, cooling plates, and sleeves are placed in the module, a human interaction is needed for the contents to move outwards from the module.

Still referring to FIG. 1, the battery assembly 100 may include four sides 108 coated in flame retardant paint. In one embodiment, the flame retardant paint may be an intumescent paint. In some embodiments, the battery assembly 100 may further include a plurality of compression pads paced between the battery cells 104. "Compression pads", as used in this disclosure, are compressible foam cushions that may be placed next to battery cells 104 or a battery pouch and is configured to provide mechanical support while protecting the battery cells 104 against shock, vibration, and thermal runaway. Common nonlimiting examples of a compression pad may include the PORON® Microcellular Urethane and the BISCO silicone anti-vibration pads, both made by Rogers Corp., Chandler, Ariz.

Additionally, or alternatively, and still referring to FIG. 1, the battery assembly 100 may further include a plurality of insulation sleeves 112. The insulation sleeves 112 may be made of any material suitable for battery insulation, such as the 3M Thermal Runaway Barrier Materials, built by 3M Corp., Saint Paul, Minn. In one embodiment, the insulation sleeves may include aerogel. In a nonlimiting example, the insulating sleeve 112 contains a soft gel that allows the sleeve to shape around one side of the battery cells.

Alternatively, or additionally, and continuing to refer to FIG. 1, battery assembly 100 may further include a plurality of cooling plates 116, each cooling plate 116 disposed between a row of battery cells 104 and an insulation sleeve 112. Each cooling plate 116 may include a first side configured to be in contact with at least a portion of a row of battery cells 108, and a second side coated with flame retardant paint, where the second side is configured to be in contact with at least a portion of an insulation sleeve 112. In one embodiment, the battery assembly 100 may include a plurality of compression pads placed between the plurality cooling plates 116 and the plurality of battery cells 108. In an embodiment, the battery assembly may include coiling cooling plates that contain wedges, where the wedges are configured to attach to at least a portion of at least a battery cell as to keep the battery cells in place. In an embodiment, the battery assembly 100 may include curved cooling plates, where each curve in the cooling plate is configured to attach to at least a portion a battery cell. In a nonlimiting example, the combination of the flame retardant coating and the insulating sleeve may help isolate the extreme temperature rise to a row of cells, or at least to a battery module so the pilot may have time to land the electric aircraft.

Alternatively, or additionally, and still referring to FIG. 1. In embodiments, the battery assembly 100 may include mounting pins 120. In some embodiments, the battery assembly 100 may include mounting channels 124, where each mounting channel 124 is configured to attach to a mounting pin 120. In a nonlimiting example, the mounting pin and the mounting channel are attached as to completely enclose the battery module. In an embodiment, the pin and mounting channel may also include a locking mechanism.

Still referring to FIG. 1, battery assembly 100 includes at least a sensor 128, where the at least a sensor is configured to detect a thermal runaway. In one embodiment, the at least a sensor 128 may be configured to detect a thermal runaway in the battery assembly 100. In one embodiment, the at least a sensor 128 may be configured to detect a thermal runaway in an adjacent battery assembly. In some embodiments, the sensor 128 may be configured to detect elevation of temperatures, which may lead to a thermal runaway. In some embodiment, the at least a sensor 128 is configured to generate a status datum. The "status datum" may include a plurality of data such as a failure signal alerting of a thermal runaway, changes in temperature, short circuit of the battery, spike in voltage, alerts related to the status of an individual cell, battery cell failure, and the like.

Still referring to FIG. 1. In some embodiments, at least a sensor 128 may comprise a plurality of sensors in the form of individual sensors or a sensor suite working in tandem or individually. At least a sensor 128 may include a plurality of independent sensors, as described herein, where any number of the described sensors may be used to detect any number of physical or electrical quantities associated with an aircraft power system or an electrical energy storage system. At least a sensor 128 may include a resistance sensor designed and configured to measure the resistance of at least an energy source. At least a sensor 128 may include separate sensors measuring physical or electrical quantities that may be powered by and/or in communication with circuits independently, where each may signal sensor output to a control circuit such as a user graphical interface. In a non-limiting example, there may be four independent sensors housed in and/or on battery pack 128 measuring temperature, electrical characteristic such as voltage, amperage, resistance, or impedance, or any other parameters and/or quantities as described in this disclosure. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability of a flight controller and/or user to detect phenomenon is maintained and in a non-limiting example, a user alter aircraft usage pursuant to sensor readings.

Additionally, or alternatively, and still referring to FIG. 1. In one embodiment, at least a sensor 128 may include a moisture sensor. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. Moisture sensor 204 may be psychrometer. Moisture sensor may be a hygrometer. Moisture sensor may be configured to act as or include a humidistat. A "humidistat", for the purposes of this disclosure, is a humidity-triggered switch, often used to control another electronic device. Moisture sensor 204 may use capacitance to measure relative humidity and include in itself, or as an external component, include a device to convert relative humidity measurements to absolute humidity measurements. "Capacitance", for the purposes of this disclosure, is the ability of a system to store an electric charge, in this case the system is a parcel of air which may be near, adjacent to, or above a battery cell.

With continued reference to FIG. 1, at least a sensor 128 may include electrical sensors. Electrical sensors may be configured to measure voltage across a component, electrical current through a component, and resistance of a component. Electrical sensors may include separate sensors to measure each of the previously disclosed electrical characteristics such as voltmeter, ammeter, and ohmmeter, respectively.

Alternatively or additionally, and with continued reference to FIG. 1, at least a sensor 128 includes a sensor or plurality thereof that may detect voltage and direct the charging of individual battery cells according to charge level; detection may be performed using any suitable component, set of components, and/or mechanism for direct or indirect measurement and/or detection of voltage levels, including without limitation comparators, analog to digital converters, any form of voltmeter, or the like. At least a sensor 128 and/or a control circuit incorporated therein and/or communicatively connected thereto may be configured to adjust charge to one or more battery cells as a function of a charge level and/or a detected parameter. For instance, and without limitation, at least a sensor 128 may be configured to determine that a charge level of a battery cell is high based on a detected voltage level of that battery cell or portion of the battery pack. At least a sensor 128 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like. At least a sensor 128 may include digital sensors, analog sensors, or a combination thereof. Sensor suite 200 may include digital-to-analog converters (DAC), analog-to-digital converters (ADC, A/D, A-to-D), a combination thereof, or other signal conditioning components used in transmission of a first plurality of battery pack data 128 to a destination over wireless or wired connection.

With continued reference to FIG. 1, at least a sensor 128 may include a multimeter. Multimeter may be configured to measure voltage across a component, electrical current through a component, and resistance of a component. Multimeter may include separate sensors to measure each of the previously disclosed electrical characteristics such as voltmeter, ammeter, and ohmmeter, respectively.

With continued reference to FIG. 1, at least a sensor 128 may include thermocouples, thermistors, thermometers, passive infrared sensors, resistance temperature sensors (RTD's), semiconductor based integrated circuits (IC), a combination thereof or another undisclosed sensor type, alone or in combination. Temperature, for the purposes of this disclosure, and as would be appreciated by someone of ordinary skill in the art, is a measure of the heat energy of a system. Temperature, as measured by any number or at least a sensor 128, may be measured in Fahrenheit (° F.), Celsius (° C.), Kelvin (° K), or another scale alone or in combination. The temperature measured by sensors may comprise electrical signals which are transmitted to their appropriate destination wireless or through a wired connection.

Additionally, or alternatively, at least a sensor 128 may include a sensor configured to detect gas that may be emitted during or after a cell failure. "Cell failure", for the purposes of this disclosure, refers to a malfunction of a battery cell, which may be an electrochemical cell, that renders the cell inoperable for its designed function, namely providing electrical energy to at least a portion of an electric aircraft. Byproducts of cell failure may include gaseous discharge including oxygen, hydrogen, carbon dioxide, methane, carbon monoxide, a combination thereof, or another undisclosed gas, alone or in combination. Further the sensor configured to detect vent gas from electrochemical cells may comprise a gas detector. For the purposes of this disclosure, a "gas detector" is a device used to detect a gas is present in an area. Gas detectors, and more specifically, the gas sensor, may be configured to detect combustible, flammable, toxic, oxygen depleted, a combination thereof, or another type of gas alone or in combination. The gas sensor may include a combustible gas, photoionization detectors, electrochemical gas sensors, ultrasonic sensors, metal-oxide-semiconductor (MOS) sensors, infrared imaging sensors, a combination thereof, or another undisclosed type of gas sensor alone or in combination. At least a sensor 128 may include sensors that are configured to detect non-gaseous byproducts of cell failure including, in non-limiting examples, liquid chemical leaks including aqueous alkaline solution, ionomer, molten phosphoric acid, liquid electrolytes with redox shuttle and ionomer, and salt water, among others. At least a sensor may include sensors that are configured to detect non-gaseous byproducts of cell failure including, in non-limiting examples, electrical anomalies as detected by any of the previous disclosed sensors or components.

With continued reference to FIG. 1, at least a sensor 128 may be configured to detect events where voltage nears an upper voltage threshold or lower voltage threshold. The upper voltage threshold may be stored in data storage system for comparison with an instant measurement taken by at least a sensor 128. The upper voltage threshold may be calculated and calibrated based on factors relating to battery cell health, maintenance history, location within battery pack, designed application, and type, among others. At least a sensor 128 may measure voltage at an instant, over a period of time, or periodically. At least a sensor 128 may be configured to operate at any of these detection modes, switch between modes, or simultaneous measure in more than one mode. At least a sensor 128 may detect events where voltage nears the lower voltage threshold. The lower voltage threshold may indicate power loss to or from an individual battery cell or portion of the battery pack. At least a sensor 128 may detect events where voltage exceeds the upper and lower voltage threshold. Events where voltage exceeds the upper and lower voltage threshold may indicate battery cell failure or electrical anomalies that could lead to potentially dangerous situations for aircraft and personnel that may be present in or near its operation.

Figure 2A:
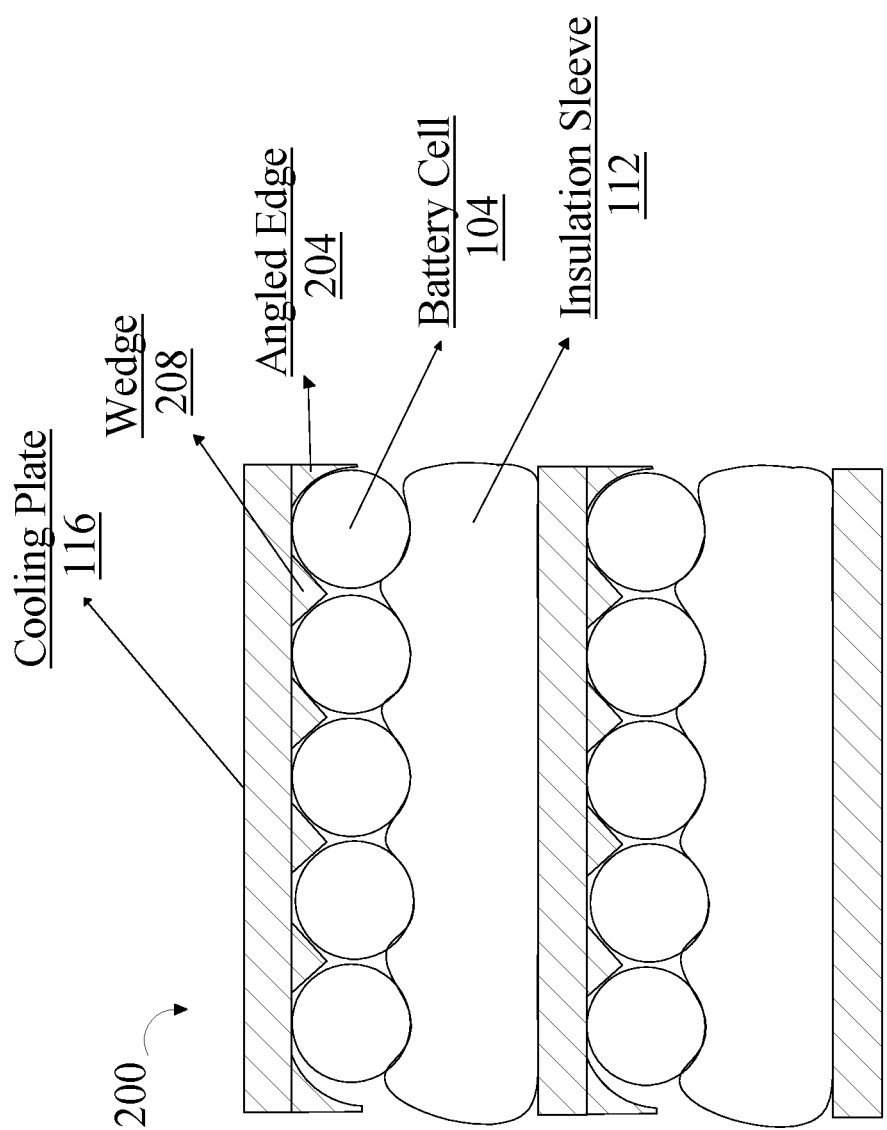
FIG. 2A is an exemplary embodiment of a section of cooling plates disposed between rows of battery cells and insulation sleeves.

Now referring to FIG. 2A, an exemplary view of a section 200 of the cooling plates 116 disposed between rows of battery cells 108 and insulation sleeves 112 is illustrated. In one embodiment, the cooling plates may include angled edges 204, where the angled edges 204 may be configured to face towards the same direction. In one embodiment, the angled edges may be further configured to wrap around a portion of a battery cell 108. In one embodiment, the cooling plates 116 may include wedges 208, where the wedges 208 are configured to restrain movement of the battery cells 108. Referring now to FIG. 2B, an exemplary section 200 of a cooling plate 116 is illustrated. In one embodiment, the cooling plate 116 includes curves 212 that are configured to wrap around a portion of the battery cells 108. In a nonlimiting example, a cooling plate 116 has wedges, made of the same material as the cooling plate, where battery cells are placed between the edges and the wedges, combined with the insulating sleeve on the other side of the battery, which keeps the cells in place. In another nonlimiting example, the cooling plate has a waving shape on the side of the battery cells, where the circular shape keeps the cells from moving.

Figure 3:
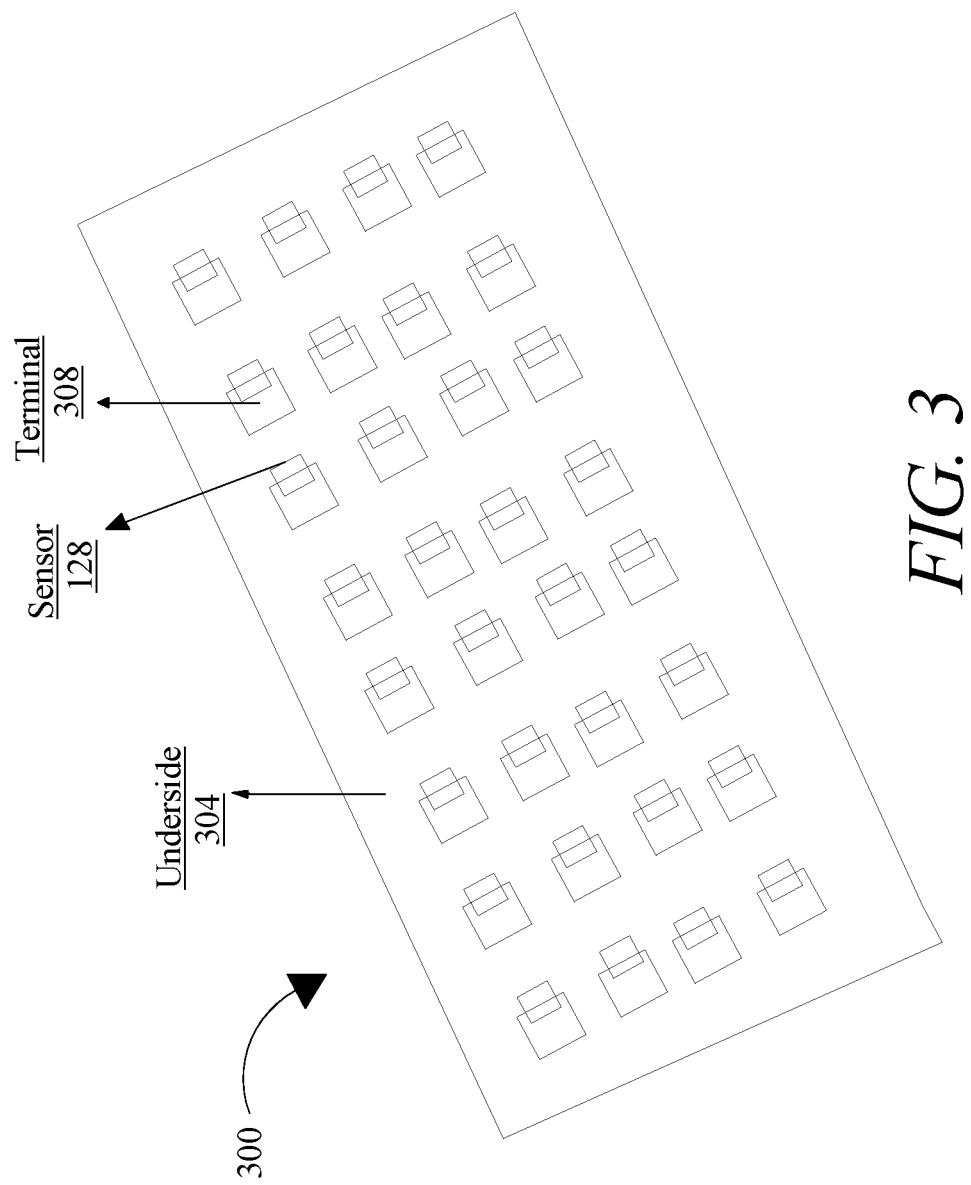
FIG. 3 is an exemplary representation of a top side of a battery module.

Now referring to FIG. 3, a representation of the battery assembly 100 top side 300 is illustrated. In some embodiments, the top part may further include an underside 304, where the underside 304 includes a plurality of terminals 308. In embodiments, the plurality of battery cells 108 are connected via the terminals 308, where the two sides angled inward of the battery module prevent the terminals 308 from pulling the underside 304 downwards. In some embodiments, the terminals may include at least a sensor 128. In a nonlimiting example, the top side may be a lid with electric terminals designed to connect the battery cells attached to the terminals 308. In another nonlimiting example, the terminals may include a sensor 128 designed to monitor the status of the battery cells 104 connected to the terminals 308.

Figure 4:
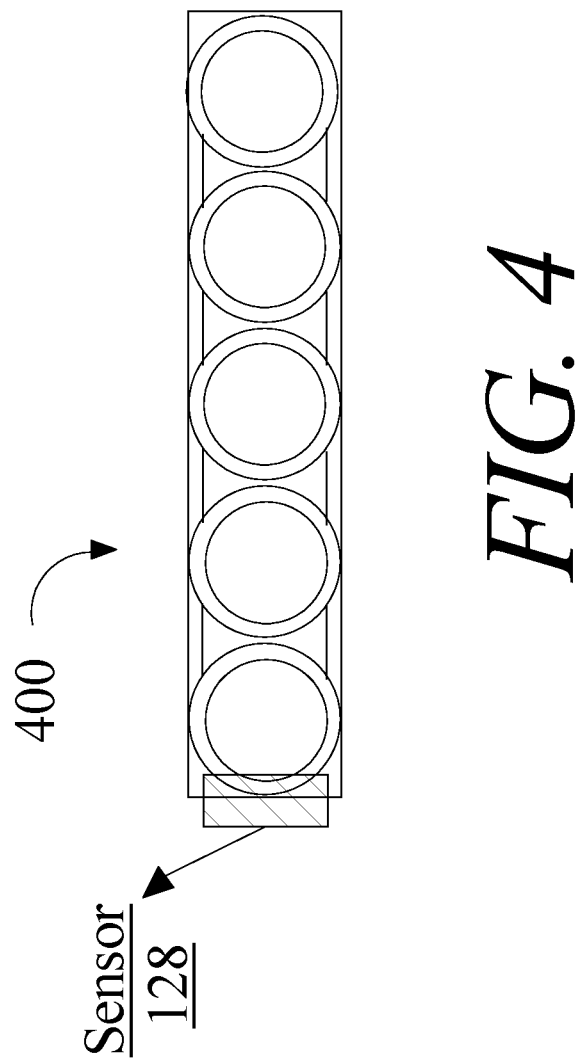
FIG. 4 is an exemplary embodiment of a cell retainer.

Referring now to FIG. 4, an exemplary embodiment of the cell retainer 400 is depicted. The cell retainer may be disposed above the row of battery cells or may be disposed below the battery cells. In one embodiment, a portion the battery cells 108 are attached to the cell retainer as to secure the cells in place. In a nonlimiting example, the cell retainer is a metal piece configured to be placed above a row of battery cells as to keep the battery cells in place. In one embodiment, the cell retainer may include at least a sensor 128 configured to monitor the battery cells 108 attached to the cell retainer 400.

Figure 5:
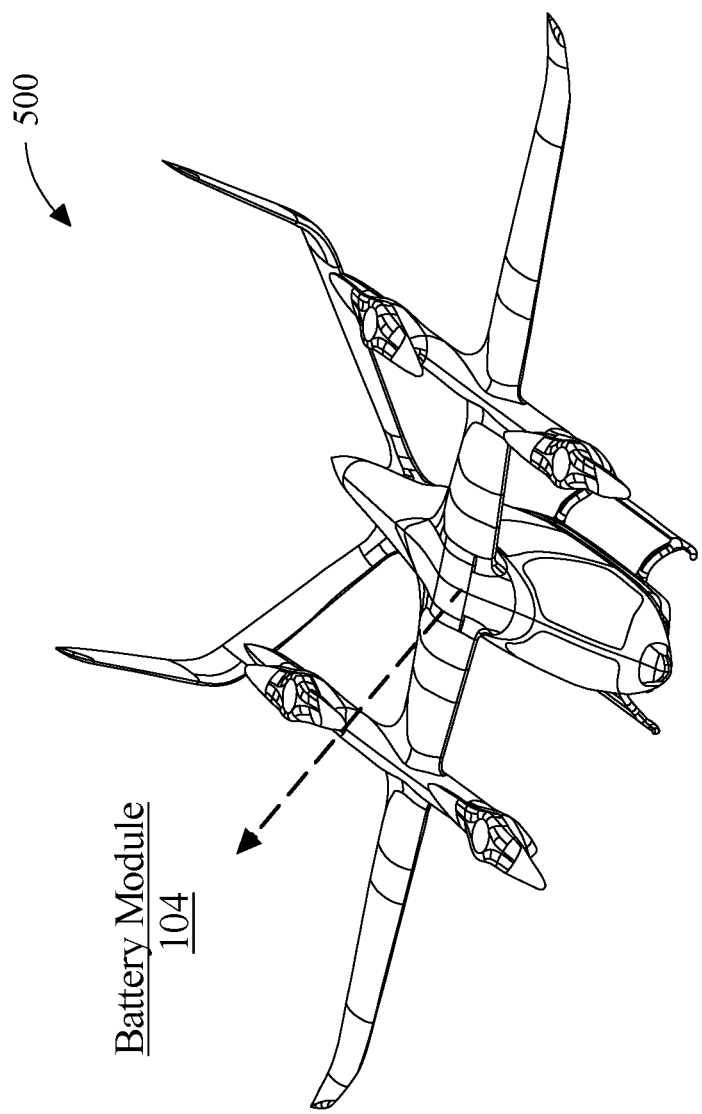
FIG. 5 is an exemplary embodiment of an electric aircraft.

Referring now to FIG. 5, an embodiment of an electric aircraft 500 is presented. In one embodiment, the electric aircraft is powered by at least a battery module 104. In some embodiments, the electric aircraft 500 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. To optimize the power and energy necessary to propel the aircraft, the eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 5, a number of aerodynamic forces may act upon the electric aircraft 500 during flight. Forces acting on an electric aircraft 500 during flight may include, without limitation, thrust, the forward force produced by the rotating element of the electric aircraft 500 and acts parallel to the longitudinal axis. Another force acting upon electric aircraft 500 may be, without limitation, drag, which may be defined as a rearward retarding force which is caused by disruption of airflow by any protruding surface of the electric aircraft 500 such as, without limitation, the wing, rotor, and fuselage. Drag may oppose thrust and acts rearward parallel to the relative wind. A further force acting upon electric aircraft 500 may include, without limitation, weight, which may include a combined load of the electric aircraft 500 itself, crew, baggage, and/or fuel. Weight may pull electric aircraft 500 downward due to the force of gravity. An additional force acting on electric aircraft 500 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 500 are designed to be as lightweight as possible. Reducing the weight of the aircraft and designing to reduce the number of components is essential to optimize the weight. To save energy, it may be useful to reduce weight of components of an electric aircraft 500, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 500 and/or propulsors.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. A battery assembly for use in an electric aircraft, the battery assembly comprising:
   a plurality of battery cells arranged in a plurality of rows of battery cells comprising a first row of battery cells;

a cooling plate extending along and contacting the first row of battery cells, wherein the cooling plate has a first side facing the first row of battery cells;

an insulation sleeve extending and contacting along an entire length of a second side of the cooling plate and disposed between the cooling plate and one row of battery cells of the plurality of rows, wherein the second side of the coolant plate is opposite and faces away from the first row of battery cells;

wherein a combination of the cooling plate and the insulation sleeve isolates and spaces the first row of battery cells from each adjacent row of battery cells;

four opposite and opposing sides, wherein at least two sides are angled inward as to secure the plurality of battery cells inside the battery assembly; and at least a sensor, wherein the at least a sensor is configured to detect a thermal runaway.

2. The battery assembly of claim 1, wherein the battery assembly further comprises a plurality of compression pads placed between the plurality of battery cells.

3. The battery assembly of claim 1, wherein the at least a sensor is further configured to detect elevation of temperatures.

4. The battery assembly of claim 1, wherein the at least a sensor is further configured to detect a short circuit of the battery assembly.

5. The battery assembly of claim 1, wherein the battery assembly further comprises a bottom side.

6. The battery assembly of claim 1, wherein the battery assembly further comprises a top side, wherein the top side is a lid.

7. The battery assembly of claim 6, wherein the top side comprises an underside, wherein the underside further comprises a plurality of terminals.

8. The battery assembly of claim 7, wherein the plurality of cells is connected via the plurality of terminals, wherein the at least two sides angled inward prevent the plurality of terminals from pulling the underside downwards.

9. The battery assembly of claim 8, wherein each terminal comprises a sensor of the at least a sensor.

10. The battery assembly of claim 6, wherein the underside of the battery assembly's top side further comprises flame retardant polyurethane foam.

11. The battery assembly of claim 1, wherein the at least a sensor is configured to generate a status datum.

12. The battery assembly of claim 1, wherein the battery assembly further comprises a first vent hole in one of the sides, and second vent hole on the side opposite to the side with the first vent hole.

13. The battery assembly of claim 12, wherein the outside of the vent holes comprises thermally conductive material that allows for cooling of the battery assembly as a function of the aircraft's movements.

14. The battery assembly of claim 1, wherein the cooling plate comprises curves, wherein each curve is configured to contain at least a portion of a battery cell.

15. The battery assembly of claim 1, wherein the cooling plate comprises wedges, wherein the wedges are configured to restrain movement of the battery cells.

16. The battery assembly of claim 1, wherein the battery assembly further comprises mounting pins.

17. The battery assembly of claim 1, wherein the battery assembly further comprises a plurality of mounting channels, wherein each mounting channel is configured to attach to a mounting pin.

18. The battery assembly of claim 1, wherein the battery assembly further comprises a cell retainer, wherein a cell retainer is configured to attach to a row of battery cells and restrain movement of the battery cells.

19. The battery assembly of claim 18, wherein the cell retainer is connected to at least a sensor.

20. The battery assembly of claim 19, wherein the at last a sensor is configured to monitor at least a battery cell.

\* \* \* \* \*